No. 643,081. Patented Feb. 6, 1900.
M. C. BULLOCK, Dec'd.
M. A. BULLOCK, Executrix.
COUPLING FOR SHAFTS.
(Application filed Apr. 29, 1898.)
(No Model.) 2 Sheets—Sheet 1.
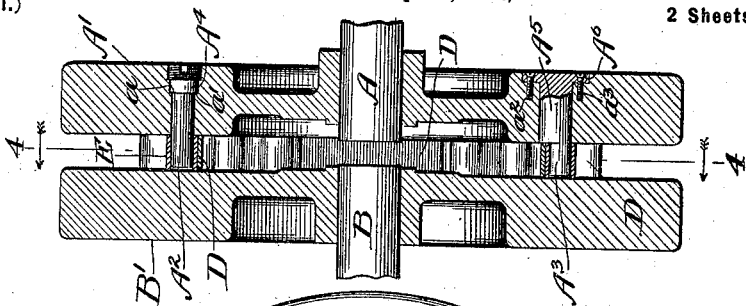
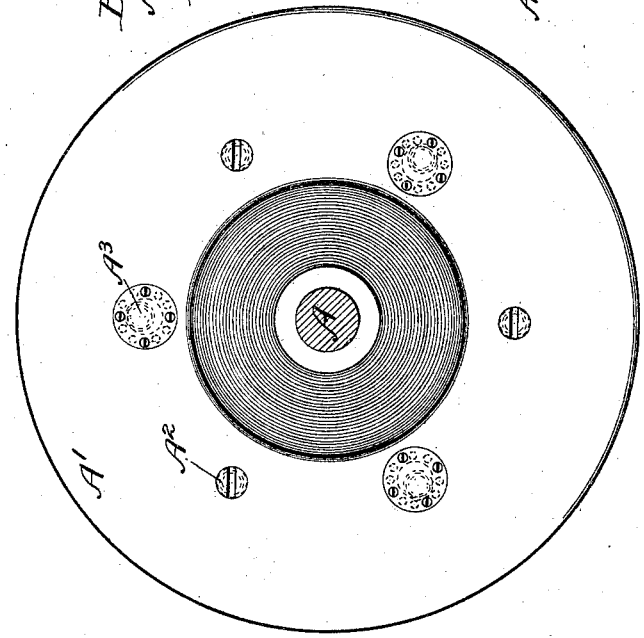
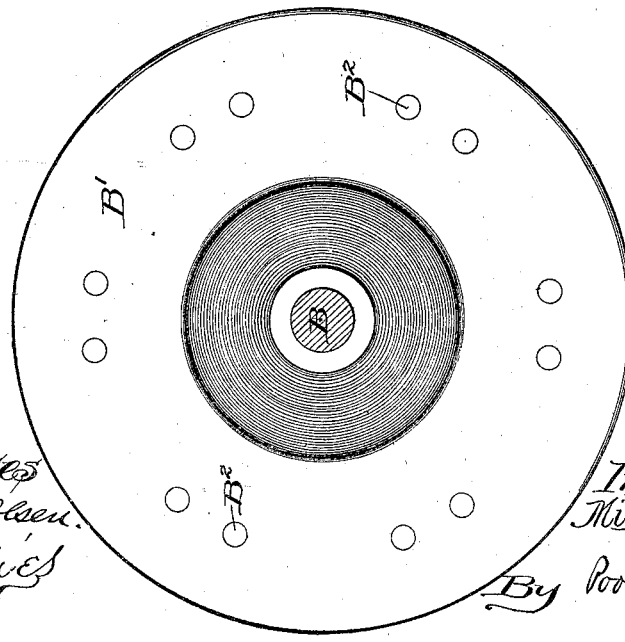
Witnesses
Martin H. Olsen
W. C. Corlies
Inventor
Milan C. Bullock
By Poole & Brown
Attys No. 643,081. Patented Feb. 6, 1900.
M. C. BULLOCK, Dec'd.
M. A. BULLOCK, Executrix.
COUPLING FOR SHAFTS.
(Application filed Apr. 29, 1898.)
(No Model.) 2 Sheets—Sheet 2.
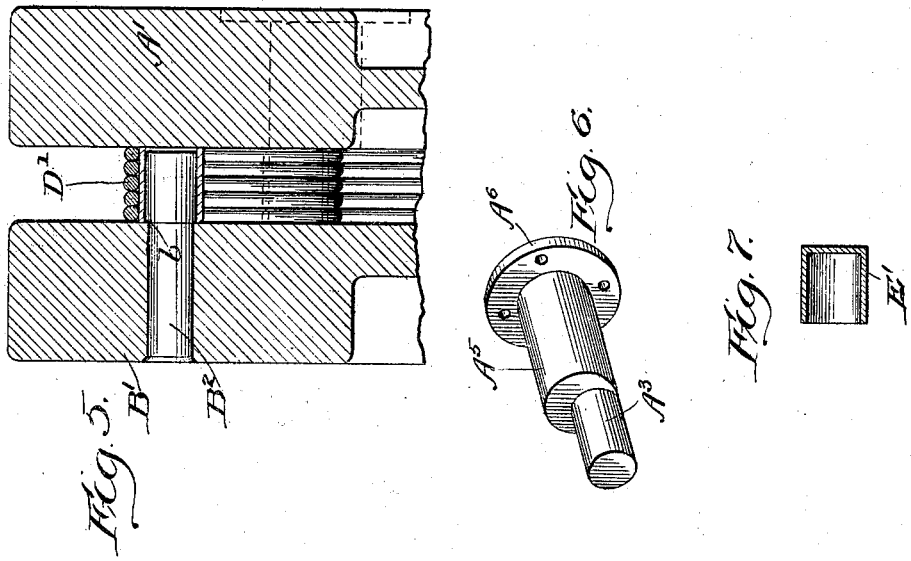
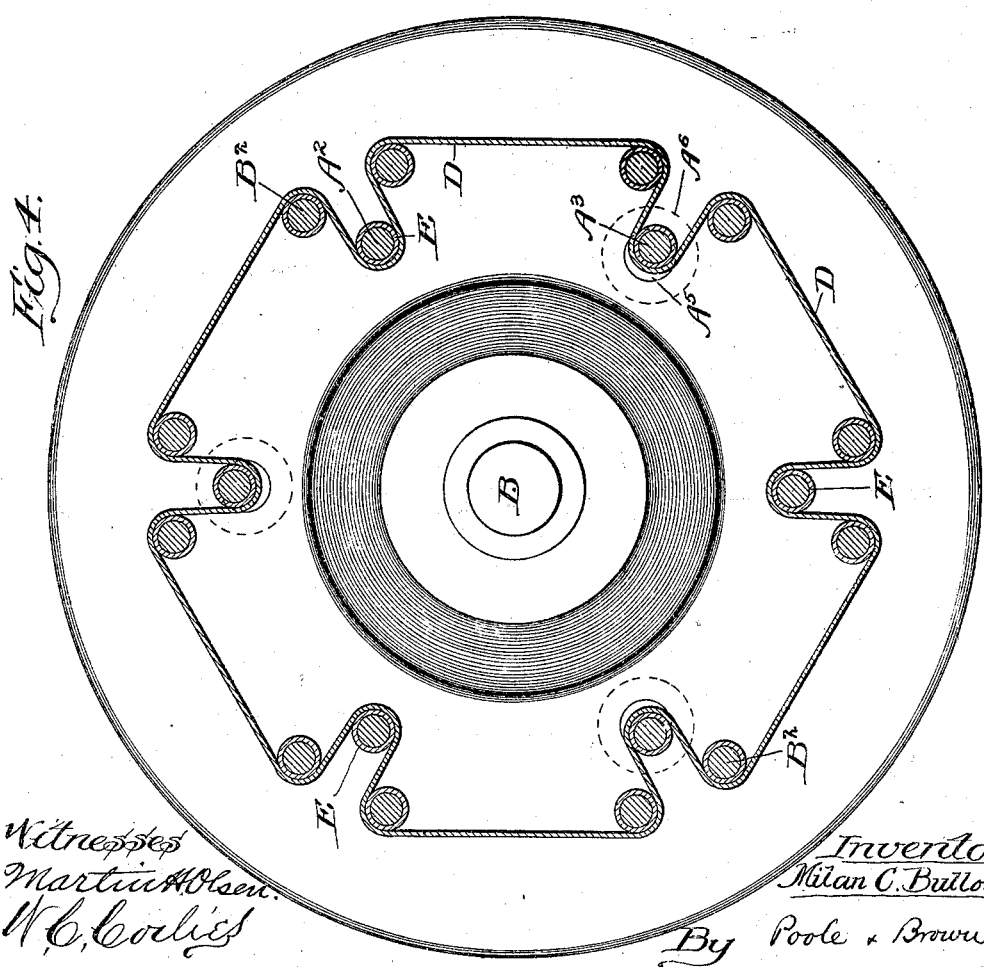
Witnesses
Martin H. Olsen
W. C. Corlies
Inventor
Milan C. Bullock
By Poole & Brown
Attys

UNITED STATES PATENT OFFICE.

MILAN C. BULLOCK, OF CHICAGO, ILLINOIS; MARY A. BULLOCK, EXECUTRIX OF SAID MILAN C. BULLOCK, DECEASED, ASSIGNOR TO MARY ANN BULLOCK.

COUPLING FOR SHAFTS.

SPECIFICATION forming part of Letters Patent No. 643,081, dated February 6, 1900.

Application filed April 29, 1898. Serial No. 679,162. (No model.)

*To all whom it may concern:*

Be it known that I, MILAN C. BULLOCK, of Chicago, in the county of Cook and State of Illinois, have invented certain new and useful Improvements in Couplings for Shafts; and I do hereby declare that the following is a full, clear, and exact description thereof, reference being had to the accompanying drawings, and to the letters of reference marked thereon, which form a part of this specification.

This invention relates to an improved coupling for shafts which are arranged end to end, and refers more specifically to improvements in such couplings constructed to enable the power to be transmitted effectively when the shafts are out of their true alinement.

The coupling herein illustrated will more commonly be employed for connecting the shaft of an engine directly with a heavy machine—as, for instance, an electric dynamo—and is especially applicable for the latter purpose, for the reason that it allows for slight settling of the bed or frame of either of the machines, wearing down of the journals, or for slight inaccuracies of alinement of the original setting of the machines and at the same time provides an insulating connection between the shafts which will prevent leakage of the current from the dynamo.

It is the purpose of this invention to provide a flexible coupling between the shafts of such machines which is so made as to permit of slight deviations in the alinement of the shafts without impairing their capacity to transmit power smoothly and uniformly without undue friction or wear.

My improved coupling is herein shown and described as located between the main shaft of a steam-engine and the armature-shaft of an electrical dynamo; but it will be understood that the coupling may be used wherever it is desired to connect a driving and a driven shaft arranged approximately in alinement with each other.

A coupling embodying the main features of my invention embraces generally, in connection with two shafts arranged end to end, parallel driving pins or projections on the shaft arranged in the same plane with each other and a flexible belt or band which is trained over or around the said pins or projections, so as to afford driving connection between the pins or projections on one shaft and those on the other shaft.

In the drawings illustrating one form of my invention, Figure 1 is an outer face view of a wheel or disk which is adapted to be attached to a dynamo-shaft. Fig. 2 is a similar view of a wheel or disk which may be attached to an engine-shaft. Fig. 3 is a cross-section of said disks in their operative positions with respect to each other. Fig. 4 is a cross-section taken on line 4 4 of Fig. 3. Fig. 5 is a fragmentary detail showing a modification. Figs. 6 and 7 are details hereinafter to be described.

In said drawings, A designates a shaft which may be the crank-shaft of a steam-engine, and B a second shaft which may be the armature-shaft of an electric dynamo, said machines being arranged so that the shafts are in alinement with each other and are located a short distance apart at their adjacent ends. Upon said shaft A is rigidly secured a disk A', which may be the fly-wheel of the engine, and upon the shaft B is rigidly secured a second disk B', which revolves in a plane parallel with the plane of revolution of the disk A', said disks being also separated by a short space. Each disk is provided on its inner face with inwardly-projecting pins, which are arranged in circular order and on a line concentric with the center of the disk and which terminate at their inner ends adjacent to the face of the opposing disk. The pins of one disk are arranged on a circle having a shorter radius than the circle on which the pins of the opposite disk are arranged. The pins on the two disks when said disks are in their operative positions, as shown in Figs. 3 and 4, are in this instance arranged in equally-spaced sets around the centers of the disks with three pins in each set, two pins being closely adjacent to each other on the outer circle and arranged to occupy the side or base angles of an isosceles triangle, while the adjacent pin on the other disk is arranged to occupy the vertex of said triangle, said vertex of the triangle being located on a radial line passing midway between the two adjacent pins on the outer circle. A flexible belt is trained about said pins arranged, as thus described, between the adjacent faces of the disks in such manner as to hold the disks from relative rotation, so that rotation of one will be communicated to the other and a driving connection will be established between the shafts.

The outer row of pins or those arranged in the larger circle may be located on either one of the disks, as desired. As herein shown, they are designated by the letters $B^2$ and are attached to the disk $B'$, which is secured upon the dynamo-shaft, while the inner row of pins, which are designated by the letters $A^2 A^3$, are connected with the disk which is attached to the engine-shaft A. Said pins $A^2 A^3$ are of different constructions and connected with the disk $A'$ in different ways, as will hereinafter more fully appear. The pins $B^2$ are arranged in pairs about the disk $B'$ closely adjacent to each other, and the several pairs thereof are equally spaced on the circular line on which they are located. As herein shown, said disk $B'$ is provided with twelve pins $B^2$, arranged in six pairs; but a larger or smaller number of pins may be employed, as found desirable in any particular instance. In the construction shown six pins are attached to the other disk $A'$, one of which when the disks are in their operative positions, as shown in Fig. 3, is located radially inside of each pair of pins $B^2$ and on the radial line which intersects the circular line on which the outer pins are arranged midway between the pins constituting each pair. The arrangement of the pins described enables the shafts and disks to be held firmly together, so that the reversing of rotation of said shafts will produce little or no relative movement or backlash between the shafts.

D, Figs. 3 and 4, designates a flat endless flexible belt which is of substantially the same width as the projecting portions of the pins between the disks and which is trained about or over the said pins in a manner to afford a flexible driving connection between the disks. Said belt is wound in zigzag order about the pins $A^2$, $A^3$, and $B^2$ and engages the outer surface of said pins $B^2$ and the inner surfaces of the pins $A^2 A^3$ and is stretched sufficiently taut to hold the pins in substantially the relation shown in Fig. 4 when there is no driving strain thereon. Said belt may be made of any suitable fibrous material, such as hemp, which has been stretched to its utmost limit, so that it will not appreciably lengthen, and thus become loose upon the pins when placed thereon and subjected to strain in communicating power from one shaft to the other. The belt will, however, possess in any case some elasticity, and the two disks will necessarily have a slight movement with relation to each other by reason of such stretching of the belt. The projecting ends of the pins will preferably be provided with cylindric sleeves or ferrules E, which are slipped over the end thereof and which are directly engaged by the belt. Said ferrules will have a slight rotary movement upon the pins and will therefore act to equalize the strain upon the parts of the belt and also to prevent wear between said belt and sleeves. For ordinary use these sleeves or ferrules will be made of brass or like material. Where, however, the coupling is to be employed in connection with alternating generators producing a high-tension current and where there is a possibility of leakage of the current from one disk to the other, these ferrules will be made of a material possessing high insulating properties, such as hard rubber or the like, preferably made of cup shape or provided with end walls to cover the ends of the pins—such, for instance, as shown in Fig. 7 and indicated by the letter $E'$. In this event the disks will be placed slightly farther apart to afford room for the additional thickness of the end walls of the sleeves.

The pins $B^2$ are herein shown as attached to the disk $B'$ by being inserted into holes or sockets bored in said disk, in which they closely fit, and riveted at their outer ends upon the outer face of said disk. The parts of said pins which engage said sockets are preferably of slightly-reduced diameter, which provides a shoulder $b$, Fig. 5, on said pins, which engages the inner face of the disk and determines accurately the location of the outer end of the pin. Different means are employed for locking the pins $A^2$ in the disk $A'$, said means being as follows: The apertures of said disks within which said pins $A^2$ are secured are made of greater diameter at their outer than at their inner ends, thereby providing an interiorly outwardly-facing annular shoulder $a$ in said apertures. The pins $A^2$ are provided on their outer ends with short heads $A^4$, which provide between the same and the shank of the pin an inwardly-facing annular shoulder $a'$, adapted to engage the shoulder $a$ in the disk and limit the inward movement of the pin in said socket. The outer ends of said apertures are screw-threaded and are engaged by exteriorly-screw-threaded cylindric plugs which are adapted to be screwed against the heads $A^4$ of the pins and act to lock said heads between the same and the shoulders $a$ in the disk.

As a further improvement the pins $A^3$, which are attached to the disk $A'$ alternately with the pins $A^2$, are adjustable radially in the disk in such manner as to tighten the belt or vary the tension thereof. In practice it will be inconvenient to place the belt upon the pins so as to be sufficiently taut for use, and the radial adjustment is provided to give the belt the required tension after it has been placed upon the pins. Furthermore, such adjustment of the pins may be employed to increase the tension upon the belt in case it becomes stretched by the strain coming upon it in use. The means herein shown for accomplishing this result are constructed as follows: The apertures in the disk which are engaged by said pins $A^3$ are made larger than those engaged by the pins $A^2$, and the parts $A^5$ of said pins, which are contained within the apertures, are made eccentric to the parts which project beyond the inner face of the disk and which are engaged by the belt D. When the belt is placed upon the pins, the eccentric portions of the pins will be located on the side thereof adjacent to the center of the disk, and when it is desired to increase the tension on said belt the pins will be rotated in the aperture one way or the other, with the result of moving the projecting ends thereof radially inward or away from the adjacent pins B² on the disk B′, which will act to take up the slack in the belt in an obvious manner. As a means for locking said pins in place they are provided on their outer ends with circular heads A⁶ of greater diameter than the eccentric portions thereof. The said heads may overlap the outer face of the disk; but preferably said disks are countersunk around the outer ends of the aperture, within which countersunk portions the heads A⁶ of said pins are contained, so that the outer surface of the heads will be flush with the outer face of the disk. Said disk is provided in said countersunk portions with a plurality of screw-apertures $a^2$, which are adapted to be engaged by holding-screws $a^3$, which pass through said heads of the pins. In order to give the required range of adjustment, a greater number of apertures $a^2$ are provided than are required at one time for locking the pin from rotation, as shown in dotted lines in Fig. 2, and so located as to present the required number of apertures at the proper places for holding the pin in any desired adjustment.

In Fig. 5 is shown a modified form of coupling-belt, which consists of a number of strands or wrappings of rope D′ instead of a single web, as in the previously-described figures. Said belt will be made from a single piece of fibrous rope, such as cotton or hemp, and is wound about the pins A², A³, and B², as in the construction previously described, a sufficient number of times to cover the projecting portions of said pins. The two ends of the ropes may be connected together by a small turnbuckle or may be spliced in any suitable manner and the belt as a whole tightened by the use of the eccentric pins in the manner as before described.

So far as the novel features of my invention are concerned the inwardly-projecting pins instead of being connected with continuous disks which are attached to the shafts may be supported in any suitable manner from or upon the shafts and may be arranged in a manner different from that herein shown.

The belt or band in the construction described, being formed of leather or fibrous material, is itself a non-conductor of electricity, so that the coupling described is in effect an insulating one adapted to prevent leakage of current from a dynamo or generator driven thereby, even though no special insulating means, such as the insulating devices described, be employed.

I claim as my invention—

1. The combination with two shafts arranged end to end and provided with parallel pins or projections, of a flexible belt or band trained over or around said projections and means for adjusting the tension of said belt or band.

2. The combination with two shafts arranged end to end and provided on their adjacent ends with parallel pins or projections, of a flexible belt or band trained over or around said projections, one or more of said pins being adjustable in position with respect to the other for varying the tension upon the said belt or band.

3. The combination with two shafts arranged in alinement with each other and provided at their adjacent ends with parallel projections or pins, of a flexible belt trained over or around said projections, the projections on one shaft being arranged radially within those on the other shaft and one or more of said projections being made radially adjustable to vary the tension on the belt or band.

4. The combination with two shafts arranged end to end and provided on their adjacent ends with parallel pins, of a flexible belt trained over or around said projections, one or more of said pins being connected with its supporting-shaft by means of a rotative cylindric part which is eccentric to that part of the pin which engages the said belt or band.

5. The combination with two shafts arranged end to end and provided with a plurality of pins arranged parallel with the axes of the shafts and on circular lines concentric with the center of the shafts, the pins on one of said shafts being arranged in pairs and the other shaft being provided with single pins located at points circumferentially intermediate to and equidistant from the pins of each of said pairs of pins and an endless flexible belt or band trained over or around said pins.

6. The combination with two shafts arranged end to end, of disks on the adjacent ends of said shafts, driving-pins mounted on said disks, an endless flexible belt or band trained about or over said pins, one or more of the pins of one of the disks being provided with eccentric parts which are mounted in the disk and are adapted to turn therein for adjusting the pin or pins.

7. The combination with two shafts arranged end to end of disks on the adjacent ends of said shafts, pins mounted on each of said disks and an endless flexible belt or band trained around or over said pins, one or more of the pins having an eccentric part which engages the disk and means for locking said eccentric part from rotation in the disk.

In testimony that I claim the foregoing as my invention I affix my signature, in presence of two witnesses, this 6th day of April, A. D. 1898.

MILAN C. BULLOCK.

Witnesses:
WILLIAM L. HALL,
W. A. WHITEHEAD.